United States Patent
Donnini et al.

(10) Patent No.: US 11,155,334 B2
(45) Date of Patent: Oct. 26, 2021

(54) FAN BLADE SUPPORT ASSEMBLY

(71) Applicant: GE AVIO S.R.L, Rivalta di Torino (IT)

(72) Inventors: Andrea Donnini, Rome (IT); Davide Lercara, Rivalta di Torino (IT); Alessandro Bordoni, Rivalta di Torino (IT)

(73) Assignee: GE AVIO S.R.L, Rivalta di Torino (IT)

( * ) Notice: Subject to any disclaimer, the term of this patent is extended or adjusted under 35 U.S.C. 154(b) by 152 days.

(21) Appl. No.: 16/293,771

(22) Filed: Mar. 6, 2019

(65) Prior Publication Data
US 2019/0276138 A1 Sep. 12, 2019

(30) Foreign Application Priority Data

Mar. 12, 2018 (EP) .................................. 18425013

(51) Int. Cl.
*B64C 11/02* (2006.01)
*B64C 11/04* (2006.01)
(Continued)

(52) U.S. Cl.
CPC .............. *B64C 11/04* (2013.01); *B64C 11/02* (2013.01); *B64C 27/32* (2013.01); *B64D 35/00* (2013.01);
(Continued)

(58) Field of Classification Search
CPC ......... B64C 11/04; B64C 11/02; B64C 27/32; B64D 35/00; F01D 5/02; F01D 11/003;
(Continued)

(56) References Cited

U.S. PATENT DOCUMENTS 1,677,535 A 7/1928 Cleave
2,225,525 A * 12/1940 Pitcairn .................. B64C 27/16
244/17.21
(Continued)

FOREIGN PATENT DOCUMENTS

GB 828132 2/1960

OTHER PUBLICATIONS

European Search Report and Written Opinion dated Sep. 6, 2018 which was issued in connection with EP 18425013.2 which was filed on Mar. 12, 2018.
(Continued)

*Primary Examiner* — Igor Kershteyn
*Assistant Examiner* — Joshua R Beebe
(74) *Attorney, Agent, or Firm* — Hanley, Flight & Zimmerman, LLC

(57) ABSTRACT

A fan blade support assembly for an aircraft is generally disclosed. The fan blade support assembly includes a fan assembly having a plurality of fan blades, a power shaft extending between the fan assembly and an engine of the aircraft, and a housing assembly positioned around the power shaft. The housing assembly includes a convergent housing and a sealing shroud. The convergent housing includes a cap, a base, and a middle portion extending therebetween. The base defines a first diameter, and the cap defines a second diameter less than the first diameter. The sealing shroud is positioned between the convergent housing and the power shaft. A gap is defined between the sealing shroud and the power shaft.

20 Claims, 6 Drawing Sheets

(51) Int. Cl.
*B64D 35/00* (2006.01)
*F01D 5/02* (2006.01)
*F01D 11/00* (2006.01)
*B64C 27/32* (2006.01)

(52) U.S. Cl.
CPC .............. *F01D 5/02* (2013.01); *F01D 11/003* (2013.01); *F05D 2220/323* (2013.01); *F05D 2240/55* (2013.01); *F05D 2240/80* (2013.01)

(58) Field of Classification Search
CPC ........... F05D 2220/323; F05D 2240/55; F05D 2240/80
USPC .................................................. 416/159, 174
See application file for complete search history.

(56) References Cited

U.S. PATENT DOCUMENTS

| | | | | |
|---|---|---|---|---|
| 2,428,128 | A * | 9/1947 | Sheppard | F16H 1/22 |
| | | | | 416/26 |
| 2,495,988 | A * | 1/1950 | Sheppard | B64C 27/12 |
| | | | | 74/665 H |
| 2,631,453 | A | 3/1953 | Larsen et al. | |
| 2,643,724 | A * | 6/1953 | Sikorsky | B64C 27/12 |
| | | | | 416/43 |
| 2,727,577 | A | 12/1955 | De Muth | |
| 3,203,485 | A * | 8/1965 | Jacobsen | B64C 27/32 |
| | | | | 416/22 |
| 3,799,473 | A | 3/1974 | Bortel | |
| 3,912,418 | A * | 10/1975 | Andrews | B64C 11/30 |
| | | | | 416/174 |
| 3,940,891 | A * | 3/1976 | Slysh | B64G 9/00 |
| | | | | 52/82 |
| 3,972,491 | A * | 8/1976 | Ferris | B64C 27/32 |
| | | | | 244/17.27 |
| 4,086,378 | A | 4/1978 | Kam et al. | |
| 4,531,694 | A | 7/1985 | Soloy | |
| 6,915,983 | B2 * | 7/2005 | Thomassey | B64C 27/12 |
| | | | | 244/17.25 |
| 7,969,037 | B2 | 6/2011 | Segovia et al. | |
| 8,186,951 | B2 | 5/2012 | Carvalho | |
| 8,820,674 | B2 * | 9/2014 | Cranga | B64C 27/001 |
| | | | | 244/17.27 |
| 9,434,462 | B2 | 9/2016 | Yan et al. | |
| 10,017,247 | B1 * | 7/2018 | Elliott | B64C 27/06 |
| 2011/0147512 | A1 * | 6/2011 | Cranga | B64C 27/001 |
| | | | | 244/17.27 |
| 2012/0159964 | A1 * | 6/2012 | Huang | F02C 7/275 |
| | | | | 60/786 |
| 2016/0194070 | A1 | 7/2016 | Doty et al. | |
| 2016/0280381 | A1 | 9/2016 | Zameroski et al. | |
| 2017/0218760 | A1 * | 8/2017 | Fontaine | F02B 41/10 |

OTHER PUBLICATIONS

European Patent Office, "Communication Under Rule 71(3) EPC," dated Feb. 10, 2021 in connection with European Patent Application No. 18425013.2, 5 pages.

* cited by examiner

FAN BLADE SUPPORT ASSEMBLY

GOVERNMENT SPONSORED RESEARCH

The project leading to this application has received funding from the Clean Sky 2 Joint Undertaking under the European Union's Horizon 2020 research and innovation program under grant agreement No. CS2-FRC-GAM-2014-2015-01.

FIELD

The present subject matter relates generally to a fan blade support assembly for an aircraft, or, more particularly, to a fan blade support assembly that includes a housing assembly with separate components for sealing and load support.

BACKGROUND

Fan driven aircraft generally include both rotary-wing aircraft, such as helicopters, and propeller driven aircraft, such as turboprop aircraft. For example, a turboprop aircraft typically generates thrust using a propeller and vertical lift using one or more wings. Helicopters generally generate both vertical thrust and forward thrust using rotary wings. Such aircraft may generally include a gas turbine engine to drive either the propeller or the rotary wings. For example, propeller driven aircraft typically include a turboprop engine, and rotary-wing aircraft typically include a turboshaft engine.

Both turboprop and turboshaft engines commonly operate in the same fashion. The gas turbine engine generally includes, in serial flow order, a compressor section, a combustion section, a turbine section, and an exhaust section. In operation, air is provided from an inlet to the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere. The turbine section is drivingly coupled to and powers the compressor section.

Further, the gas turbine engine may include an output shaft coupled to a fan assembly. For example, the fan assembly may include a propeller (e.g., a turboprop aircraft) or the fan assembly may include rotary wings (e.g., helicopters). Further, a speed change mechanism such as a gearbox is often used to couple the output shaft of the gas turbine engine to a power shaft which drives the fan. As such, the aircraft may include a housing assembly for supporting the power shaft, lubricating the power shaft bearings and splines, and transferring the loads generated by the fan (e.g, thrust, lift, etc.).

Therefore, a housing assembly with segregated structure, improved heat exchange, easier inspectability, and improved crack prevention behavior would be useful. More particularly, a housing assembly that separates the sealing function of the housing assembly from the load supporting function may allow efficient performance of both roles and would be welcome in the art.

BRIEF DESCRIPTION

Aspects and advantages will be set forth in part in the following description, or may be obvious from the description, or may be learned through practice of the invention.

In one aspect the present disclosure is directed to a fan blade support assembly for an aircraft. The fan blade support assembly includes a fan assembly having a plurality of fan blades, a power shaft extending between the fan assembly and an engine of the aircraft, and a housing assembly positioned around the power shaft. The housing assembly includes a convergent housing and a sealing shroud. The convergent housing includes a cap, a base, and a middle portion extending therebetween. The base defines a first diameter, and the cap defines a second diameter less than the first diameter. The sealing shroud is positioned between the convergent housing and the power shaft. A gap is defined between the sealing shroud and the power shaft.

In another embodiment, the housing assembly further includes a support at the cap of the convergent housing. The support may extend between the convergent housing and the fan assembly. In a further embodiment, the fan blade support assembly further includes a thrust bar extending between a frame of the aircraft to at least one of the fan assembly or the support. In yet another embodiment, the housing assembly further includes a lower shroud extending between an outer diameter at the base of the convergent housing and the sealing shroud. In one embodiment, the fan blade support assembly further includes an assembly casing extending between the power shaft and the outer diameter of the lower shroud. The lower shroud and the assembly casing may define a passageway therebetween for the passage of a lubricant.

In another embodiment, a diameter of the middle portion transitions between the first diameter and the second diameter. In a further embodiment, the transition between the first diameter and the second diameter is a linear transition. In one exemplary embodiment, the sealing shroud provides lubricant to the power shaft and a bearing. In a still further embodiment, the convergent housing transfers forces acting on the fan assembly to a frame of the aircraft. In another embodiment, the middle portion is formed from a plurality of intersecting support members. The intersecting support members may define a plurality of cavities therebetween such that the convergent housing is a reticular convergent housing. In a still further embodiment, the middle portion is formed from a plurality of ribs extending between the base and the cap. One or more pockets may be defined between adjacent ribs such that the convergent housing is a ribbed convergent housing.

In one exemplary embodiment, the fan blade support assembly further includes a speed change mechanism positioned between the power shaft and the engine. In still another embodiment, the engine includes an output shaft coupled to the speed change mechanism. In a further embodiment, the bearing supports the power shaft. The sealing shroud may at least partially house the bearing. In one exemplary embodiment, the bearing is at least one of a ball bearing or a radial bearing. In a further embodiment, the fan blade support assembly further includes a seal positioned between the sealing shroud and at least one of the convergent housing or the lower shroud to define a boundary therebetween.

In another aspect, the present disclosure is directed toward an aircraft. The aircraft includes an engine, a fan assembly, a power shaft, and a housing assembly. The fan assembly is attached to the engine and includes a plurality of fan blades. The power shaft extends between the fan assembly and the engine of the aircraft. The housing assembly is positioned around the power shaft. The housing assembly includes a convergent housing and a sealing shroud. The convergent housing includes a cap, a base, and a middle portion extending therebetween. The base defines a first diameter, and the cap defines a second diameter less than the first diameter. The sealing shroud is positioned between the convergent housing and the power shaft. A gap is defined between the sealing shroud and the power shaft.

In one embodiment, the aircraft is at least one of a propeller driven aircraft or a rotary-wing aircraft. In another embodiment, the middle portion is formed from a plurality of ribs extending between the base and the cap. One or more pockets may be defined between adjacent ribs such that the convergent housing is a ribbed convergent housing. In a further embodiment, the middle portion is formed from a plurality of intersecting support members. The intersecting support members may define a plurality of cavities therebetween such that the convergent housing is a reticular convergent housing.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
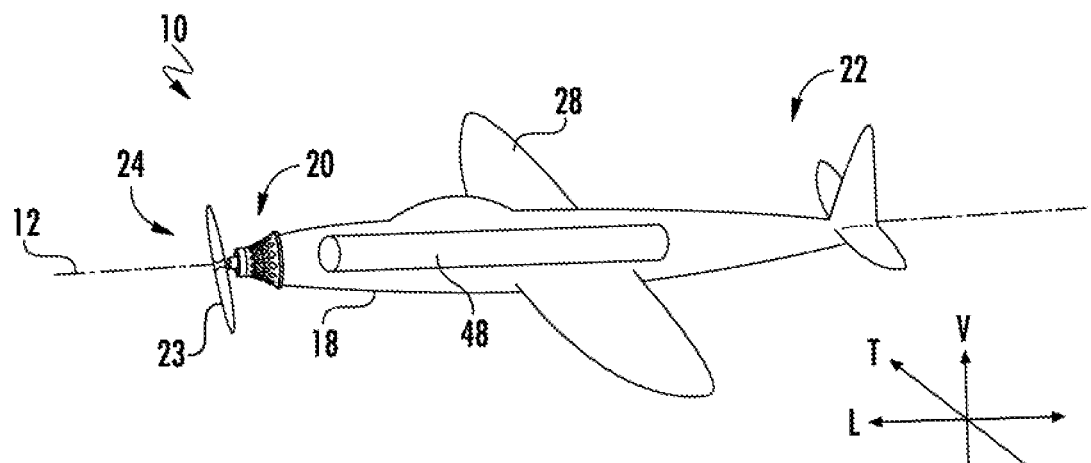
FIG. 1 is a perspective view of an exemplary propeller driven aircraft according to aspects of the present disclosure.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A fan blade support assembly is generally provided which may be particularly useful with a variety of aircraft, such as propeller driven aircraft, rotary-wing aircraft, etc. In one embodiment, a fan blade support assembly includes a segregated housing assembly which may allow for a housing assembly with better performance. For example, a housing assembling that includes a sealing structure, such as a sealing shroud, separate from the load supporting structure, such as a convergent housing, may allow for a specialized design on each structure. As such, the load supporting structure may be designed in order to reduce the mass of the structure. In certain embodiments, a convergent housing may be customized according to a particular load peculiarity of the overall aircraft design. Further, the sealing structure may be designed for improved air and sump heat exchange capability. For example, larger surface areas may be utilized to allow more contact with surrounding air. Further, such a design may allow for improved inspectability. As such, the load supporting structure may be an open cage that allows inspection of other assembly parts. The load supporting structure may also be designed such that crack propagation is halted or slowed. For example, a reticular convergent housing may include multiple load paths to allow a crack to propagate in a direction and extinguish itself as a fail safe concept.

Figure 2:
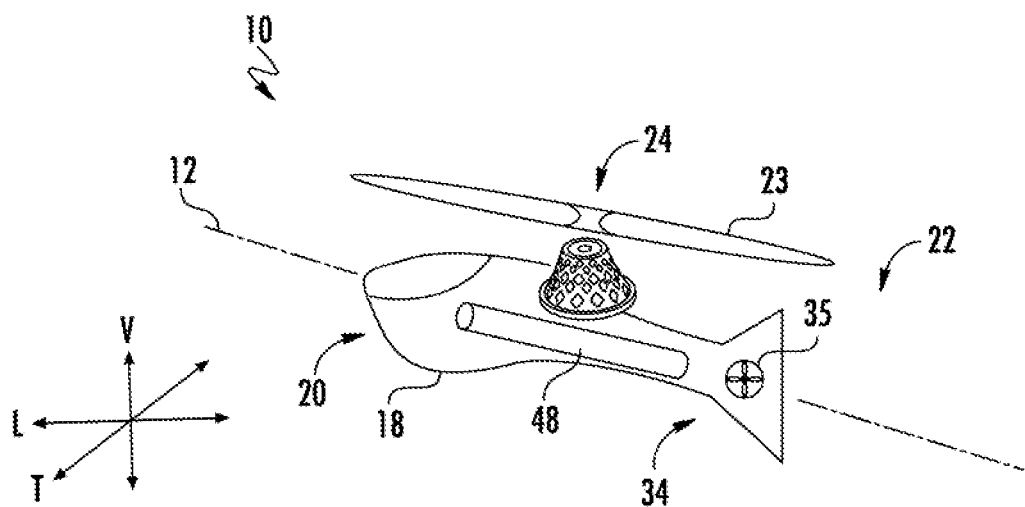
FIG. 2 is a perspective view of an exemplary rotary-wing aircraft according to aspects of the present disclosure.

Referring now to the drawings, FIGS. 1-2 depict exemplary aircraft 10 in accordance with various embodiments of the present disclosure. For example, FIG. 1 provides a perspective view of an exemplary propeller driven aircraft, and FIG. 2 provides a perspective view of an exemplary rotary-wing aircraft. As shown, the aircraft 10 defines a longitudinal direction L (and a longitudinal centerline 12 that extends therethrough), a vertical direction V, and a transverse direction T. For the illustrated embodiments, the aircraft 10 includes a fuselage 18 extending between a forward end 20 and an aft end 22 generally along the longitudinal centerline 12 of the aircraft 10. Further, a frame 48 may extend from the forward end 20 to the aft end 22. For the embodiments shown, the frame 48 generally supports the fuselage 18 and other components of the aircraft 10. The aircraft 10 may generally include a fan assembly 24 with a plurality of fan blades 23.

Referring particularly to FIG. 1, the aircraft 10 may be a propeller driven aircraft. For the embodiment depicted, the aircraft 10 includes at least one wing 28 extending from the fuselage 18. The wing 28 may be attached to or formed integrally with the fuselage 18 and may extend outwardly relative to the fuselage 18. The wings 28 may generally provide lift to the aircraft 10 when introduced to an aerodynamic flow. It will be appreciated that although the port and starboard wings are depicted as being separate wings 28, in other embodiments, the port wing and starboard wings may be formed integrally and together attached to the fuselage 18.

Referring particularly to FIG. 2, the aircraft 10 may be a rotary-wing aircraft. The fan assembly 24 generally provides vertical thrust in the vertical direction V and thrust in a perpendicular direction to steer the rotary-wing aircraft, such as, the longitudinal direction L, the transverse direction T, or any combination of the two. The exemplary rotary-wing aircraft generally includes a tail section 34 attached to or formed integrally with the fuselage 18 extending generally along the longitudinal direction L. For the illustrated embodiment, the rotary-wing aircraft also includes a tail rotor 35 at the aft end 22 of the aircraft 10. The tail rotor 35 may generate thrust in the transverse direction T in order to counteract the torque effect caused by the fan assembly 24 on the aircraft 10.

Figure 3:
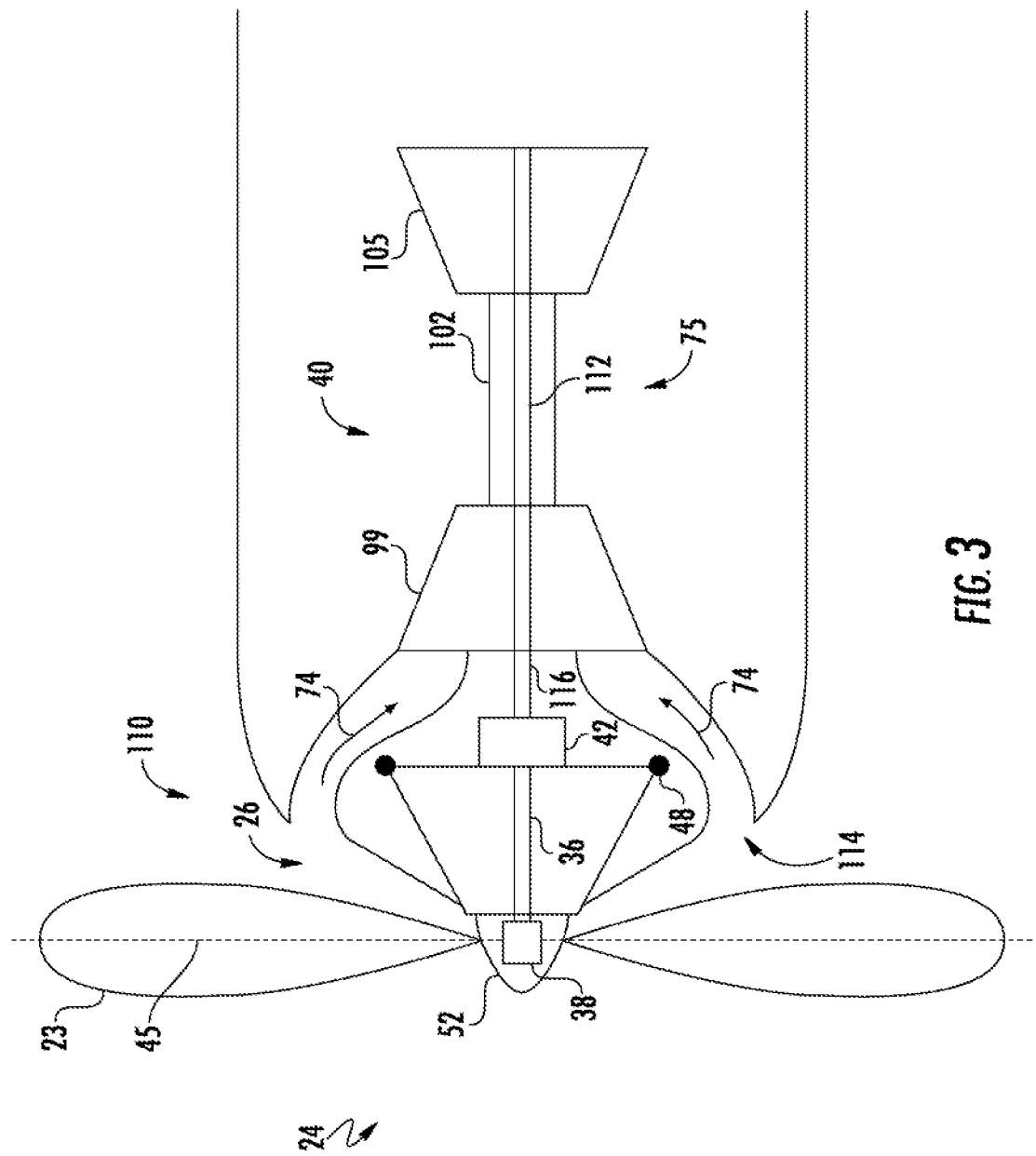
FIG. 3 is a schematic, cross-sectional view of an exemplary gas turbine engine and a fan blade support assembly according to aspects of the present disclosure.

Referring now to FIG. 3, a schematic, cross-sectional view is provided of an exemplary gas turbine engine 40 and one embodiment of a fan blade support assembly 110, such as for use with the aircraft 10 shown in FIGS. 1 and 2. For the embodiment depicted, the engine 40 includes in serial flow order, a compressor section 99, a combustion section 102, and a turbine section 105. The compressor section 99 may include one or more compressors, such as a low pressure compressor and a high pressure compressor. Similarly, the turbine section 105 may include one or more turbines, such as a low pressure turbine and a high pressure turbine. In other embodiments, other configurations may be utilized for the compressor section 99 and turbine section 105. During operation, a flow of air 74 is received within the compressor section 99 through an inlet 114 and is progressively compressed as it flows therethrough by one or more compressors. The now compressed flow of air 74 is then provided to the combustion section 102 where it is mixed with fuel and burned to generate hot combustion gas.

The hot combustion gas is expanded through the turbine section 105 where rotational energy is extracted therefrom by one or more turbines. These components may be enclosed within a casing. Notably, the compressor section 99, combustion section 102, and turbine section 105 together define a core air flowpath 75 through the engine 40.

For the embodiment depicted, the turbine section 105 is connected to the compressor section 99 through a shaft 112 or spool, such that a rotation of the turbine section 105 additionally rotates the compressor section 99. The engine 40 may include one or more shafts 112 for coupling multiple compressors to multiple turbines. For example, a shaft 112 may connect a high pressure compressor and high pressure turbine, and another shaft 112 may connect a low pressure compressor and a low pressure turbine.

At least one shaft 112 (e.g., a low pressure drive shaft or a high pressure drive shaft) additionally drives an output shaft 116. The output shaft 116 may be coupled to or attached to the shaft 112 via a rigid coupling or flexible coupling. Though, it should be recognized that in other embodiments the output shaft 116 may be formed integrally with the shaft 112. The output shaft 116 may extend to a speed change mechanism 42. For the embodiment depicted, the speed change mechanism 42 is positioned between a power shaft 36 and the engine 40. The speed change mechanism 42 may be configured as a gearbox, such as planetary gearbox. Further, in still other embodiments, the speed change mechanism 42 may be any other suitable mechanism for altering the rotational speed from the output shaft 116 to the power shaft 36. For example, in other exemplary embodiments, the speed change mechanism 42 may be a transmission. As such, in certain embodiments, the transmission may be one of a continuously variable transmission or a hydraulic transmission.

Still referring to FIG. 3, an exemplary fan blade support assembly 110 is illustrated in accordance with the embodiments of the present disclosure. For the depicted embodiment, the fan blade support assembly 110 includes the power shaft 36. The power shaft 36 may extend between the fan assembly 24 and the engine 40. For example, the power shaft 36 may extend into the speed change mechanism 42. Further, in other embodiments, the power shaft 36 may be coupled to the engine 40 via a rigid coupling or a flexible coupling between the power shaft 36 and the output shaft 116. Further still, the power shaft 36 may be formed integrally with the output shaft 116 and/or the shaft 112. In the depicted embodiment, the speed change mechanism 42 indirectly couples the power shaft 36 to the engine 40 via the output shaft 116. For the illustrated embodiment, the power shaft 36 drivingly couples the fan blades 23 to the engine 40 of the aircraft 10. The power shaft 36 may be oriented approximately in the longitudinal direction L and may be approximately parallel to the centerline 12. In another embodiment, such as the aircraft 10 of FIG. 2, the power shaft 36 is oriented approximately in the vertical direction V. Further, it should be recognized that one or more intermediary shafts or structures may couple the power shaft 36 to the speed change mechanism 42.

Further, in the illustrated embodiment, the fan blade support assembly 110 includes a housing assembly 26 (as will be described in more detail below) to support and lubricate the power shaft 36. In the depicted embodiment, the housing assembly 26 is positioned around the power shaft 36. The housing assembly 26 may be coupled to a frame 48 of the aircraft 10 in order to support the power shaft 36. For instance, the housing assembly 26 may be coupled or attached to the frame 48 via bolts, screws, adhesives, welding, etc. It should be recognized that the housing assembly 26 may be directly coupled to the frame 48 or indirectly coupled to the frame 48 via the fuselage 18 or another casing.

Further, as described briefly in regards to FIGS. 1-2, the fan blade support assembly 110 includes a fan assembly 24 including a plurality of fan blades 23. As shown in the embodiment depicted, the fan assembly 24 includes a pitch change mechanism 38 for changing the orientation of the fan blades 23. For example, each of the plurality of fan blades 23 is rotatably coupled to a hub 52 about a respective pitch axis 45. In the illustrated embodiment, the pitch change mechanism 38 operably rotates each of or all of the fan blades 23 about their respective pitch axes 45. As will be appreciated, for the embodiment shown, changing a pitch of the plurality of fan blades 23 may allow for a modification of an amount of thrust generated by the fan assembly 24 during operation without requiring a change in a rotational speed of the power shaft 36 and/or the engine 40.

Figure 4:
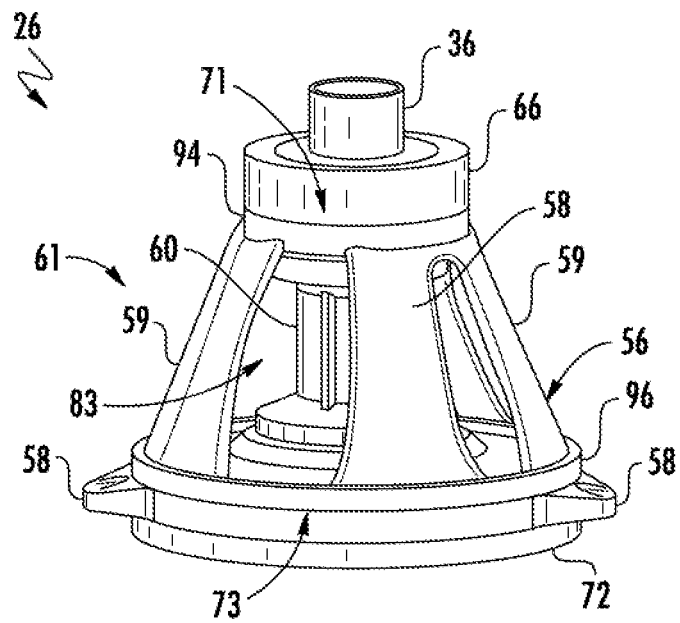
FIG. 4 is a view of an exemplary housing assembly according to aspects of the present disclosure.

Referring now to FIG. 4, an exemplary embodiment of a housing assembly 26 is illustrated in accordance with aspects of the disclosure. The housing assembly 26 may be utilized in the embodiments described in FIGS. 1-3 or in any other capable system.

Generally, the housing assembly 26 is stationary and supports a rotating power shaft 36 that extends therethrough and provides lubrication thereto. For the illustrated embodiment, the housing assembly 26 includes a convergent housing 56 that may transfer the forces acting on the fan assembly 24 to a frame 48 of the aircraft 10 (such as the aircraft 10 of FIGS. 1 and 2). For the depicted embodiment, the convergent housing 56 is in a fixed orientation in relation to the power shaft 36. For the illustrated embodiment, the convergent housing 56 includes a base 96 defining a first end 73 of the convergent housing 56 and a cap 94 defining a second end 71 opposite the first end 73 of the convergent housing 56. Further, as shown, a middle portion 61 extends between the cap 94 and the base 96.

For the illustrated embodiment, the middle portion 61 may include a first diameter at the base 96 and a second diameter at the cap 94 less than the first diameter. A convergent shape of the convergent housing 56 may be defined by a transition between the first diameter at the base 96 to the second diameter at the cap 94. In some embodiments, the middle portion 61 transitions between the first diameter and the second diameter in a generally linear fashion (i.e., conical). It should be recognized that, in other embodiments, the middle portion 61 may take on any shape such as a curved shape, a step-wise shape, or may be generally represented by one or more polynomials of any degree, or a combination of the preceding.

For the exemplary embodiment, the convergent housing 56 is illustrated including a number of ribs 59 such that the convergent housing 56 is a ribbed convergent housing. For example, the middle portion 61 includes a plurality of ribs 59 for the forces (e.g. tension, compression, and torque) to act though. As such, for the depicted embodiment, the plurality of ribs 59 extends between the base 96 and the cap 94. Further, one or more pockets 83 are defined between adjacent ribs 59. The orientation, number, and characteristics of the ribs 59 and pockets 83 may be selected by considering the design aspects and minimum requirements for the aircraft 10.

For the embodiment illustrated in FIG. 4, the fan blade support assembly 110 may include a support 66 extending between the convergent housing 56 and the fan assembly 24. The support 66 may communicate the forces acting on the fan assembly 24 (as shown in FIG. 3) and power shaft 36 to the convergent housing 56. For the depicted embodiment, the support 66 is in a fixed orientation in relation to the power shaft 36. For example, the support 66 may be located proximate to the cap 94 of convergent housing 56 and couple the convergent housing 56 to the fan assembly 24. In one embodiment, the support 66 may be formed integrally with at least one of the convergent housing 56 or the fan assembly 24. In further embodiments, the support 66 may be a separate component coupled to (e.g., via bolts, adhesive, or welding) to at least one of the convergent housing 56 or the fan assembly 24.

It should be recognized that the convergent housing 56 may be directly coupled to the frame 48 or may be coupled via intermediary structures, such as a fuselage 18 or another casing. In the embodiment depicted, the convergent housing 56 is coupled to the frame 48 using at least one fastening point 58. The fastening point 58 may be formed integrally with the housing assembly 26 or may be adhered thereto. As such, for the illustrated embodiments, the forces acting on the convergent housing 56 are transferred to the frame 48 of the aircraft 10. In the embodiment illustrated, the fastening point(s) 58 are shown as apertures configured to be used with mechanical fasteners (e.g., bolts, screws, etc.). It should be recognized that the fastening points 58 may have any shape and may generally be used for attaching the housing assembly 26 to the frame 48. For example, the fastening points 58 may be welded to the frame 48 or may be attached using adhesives, rivets, etc. Further, in another embodiment, the base 96 may be directly coupled to the frame 48 via adhesives or welding.

Figure 5:
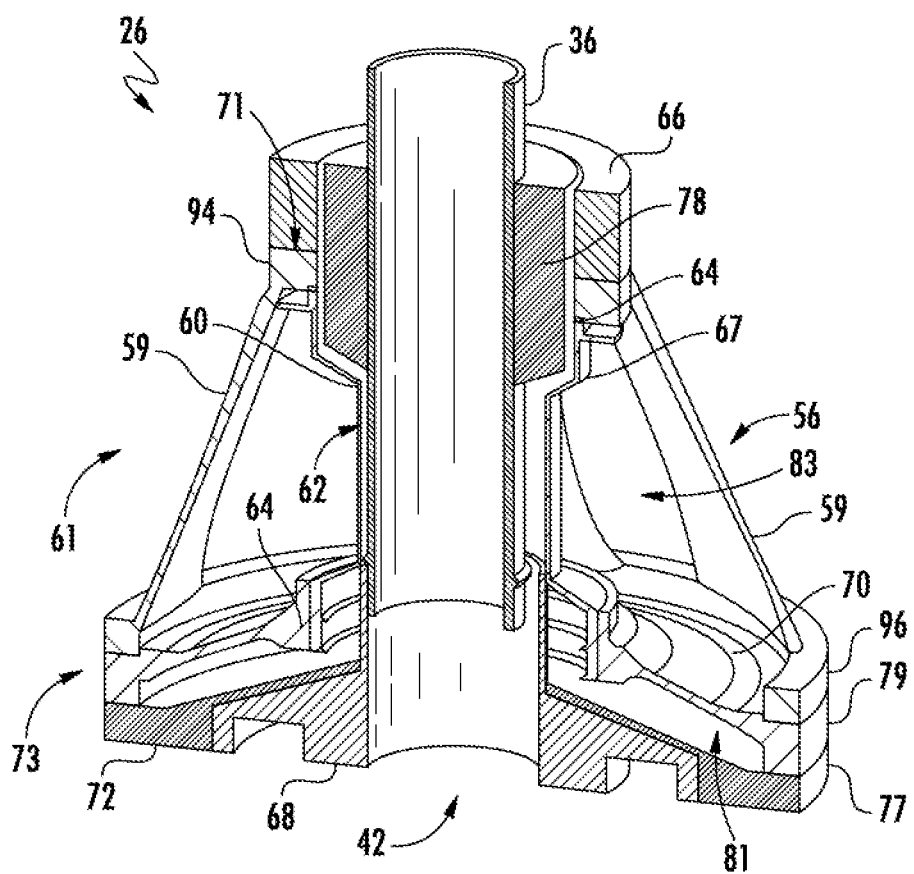
FIG. 5 is a cross-sectional view of the housing assembly of FIG. 4.

Referring now to FIG. 5, a cross-section view of the exemplary housing assembly 26 of FIG. 4 is illustrated according to aspects of the present subject matter. For the embodiment depicted, the housing assembly 26 includes a sealing shroud 60 providing lubrication to the power shaft 36. For example, the sealing shroud 60 may define a lubrication conduit (gap 62) surrounding the power shaft 36. For the depicted embodiment, the sealing shroud 60 is in a fixed orientation in relation to the rotating power shaft 36. For the embodiment shown, the sealing shroud 60 is positioned between the convergent housing 56 and the power shaft 36 and defines the gap 62 therebetween for the passage of a lubricant (e.g., oil). For the embodiment illustrated, the sealing shroud 60 provides lubricant to the power shaft 36 and a bearing 78 via the gap 62. For instance, the gap 62 may feed lubricant to the power shaft 36 and/or the bearing 78 (as described in more detail below), drain lubricant, or both. In another embodiment, the sealing shroud 60 may include integrated oil ducts attached outside the gap 62. For the depicted embodiment, the sealing shroud 60 may generally extend parallel to the power shaft 36. In other embodiments, the sealing shroud 60 may generally extend parallel to the convergent housing 56. For example, the sealing shroud 60 may be formed in a convergent shape.

For the illustrated embodiment, the housing assembly 26 includes a lower shroud 70. For instance, the lower shroud 70 may extend between an outer diameter 79 at the base 96 of the convergent housing 56 and the sealing shroud 60. For the depicted embodiment, the lower shroud 70 is in a fixed orientation in relation to the rotating power shaft 36. The lower shroud 70 may be formed integrally with at least one of the sealing shroud 60 or the convergent housing 56. In other embodiments, the lower shroud 70 may be a separate component from the sealing shroud 60 and attached thereto.

In the exemplary embodiment illustrated, the fan blade support assembly 110 includes an assembly casing 72 extending between the power shaft 36 and the outer diameter 79 at the lower shroud 70. The assembly casing 72 may segregate the housing assembly 26 from a speed change mechanism 42, such as an outermost stage 68 of a gearbox. For the illustrated embodiment, the assembly casing 72 is in a fixed orientation in relation to the rotating power shaft 36. The lower shroud 70 and assembly casing 72 may define a passageway 81 therebetween for the flow of a lubricant, such as to the power shaft 36. For example, the passageway 81 may be in fluid communication with the gap 62 such that lubricant can flow to and from the gap 62. Further, a drain 77 in fluid communication with the passageway 81 may be used to expel the lubricant from the housing assembly 26. For example, lubricant in the gap 62 may be drained via the passageway 81 and subsequently the drain 77.

In the illustrated embodiment, the housing assembly 26 includes one or more seals 64 positioned between the various components of the housing assembly 26 to define a boundary therebetween. For example, the seal 64 may define a boundary between the sealing shroud 60 and the convergent housing 56 at the cap 94 and/or the base 96. In the illustrated embodiment, one or more seals 64 define a boundary between the sealing shroud 60 and the lower shroud 70. Further, in other embodiments, one or more seals 64 may define boundaries between the lower shroud 70, the convergent housing 56, and/or the assembly casing 72. As such, the seals 64 may prevent the lubricant from leaking from the passageway 81 and/or the gap 62.

For the illustrated embodiment, the housing assembly 26 includes a lubrication system. For example, the housing assembly 26 may include at least one bearing 78 supporting the power shaft 36, such as from axial and/or tangential forces. For example, the bearing 78 may be a ball bearing, such as a thrust bearing, supporting the power shaft 36 from axial forces approximately parallel to the power shaft 36. The ball bearing may also support the power shaft 36 from forces tangential to the power shaft 36. The bearing 78 may also be a radial bearing supporting the power shaft 36 from forces tangential to the power shaft 36. It should be recognized that the housing assembly 26 may include one or more of both the radial bearing and the ball bearing or only one type of bearing 78. For the embodiment depicted, the bearing 78 is at least partially housed by one or more of the sealing shroud 60, the cap 94 of the convergent housing 56, and/or the support 66. Still in other embodiments, the bearing 78 may be located externally from the housing assembly 26. The bearing 78 may be in fluid communication with the gap 62. For example, the sealing shroud 60 may supply the bearing 78 with a lubricant, such as oil, via the gap 62 and/or the passageway 81.

Still referring to FIG. 5, for the embodiment illustrated, the housing assembly 26 may include a sensor cavity 67 defining a space for the placement of sensors and/or detectors. For the illustrated embodiment, the sensor cavity 67 is defined between the sealing shroud 60 and at least one of the bearing 78 or the power shaft 36. For example, the sensor cavity 67 may be located proximate to the cap 94. The sensors and/or detectors may be used to monitor the speed of the power shaft 36, the temperature of the various components of the fan blade support assembly 110, or the health of any bearing(s) 78. It should be recognized that the sensor(s) may detect and communicate various other characteristics of the fan blade support assembly 110. Further, in other embodiments, the sensor cavity 67 may be located anywhere else along the length of the bearing 78 and/or the power shaft 36 (e.g., proximate to the lower shroud 70).

Figure 6:
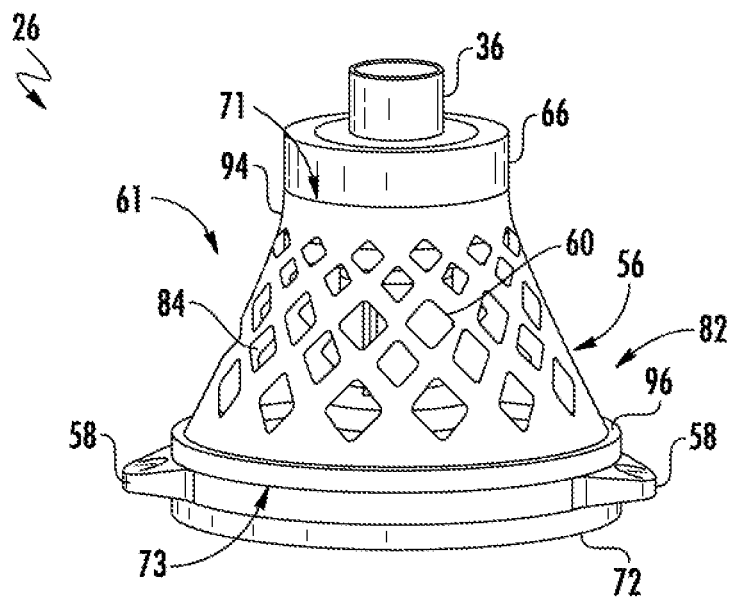
FIG. 6 is a view of another exemplary housing assembly with a reticular convergent housing according to aspects of the present disclosure.
Figure 7:
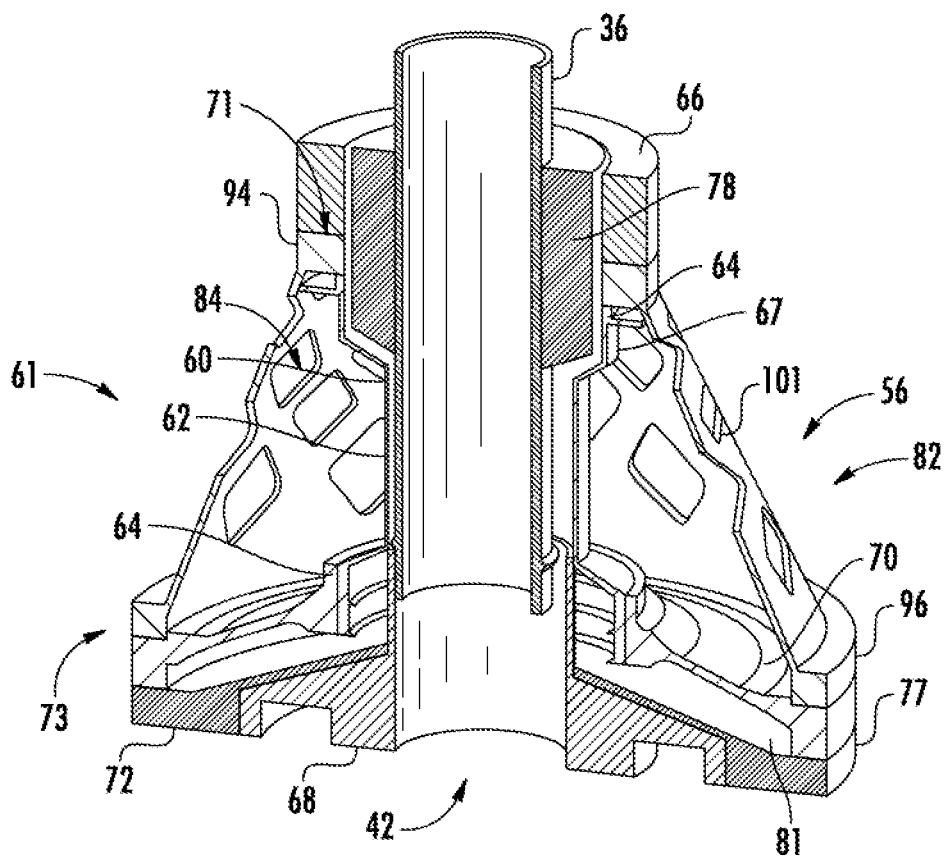
FIG. 7 is a cross-sectional view of the housing assembly of FIG. 6.

Referring now to FIGS. 6 and 7, another exemplary housing assembly 26 is illustrated with another embodiment of a convergent housing 56. In the depicted embodiment, the convergent housing 56 is illustrated including a mesh 82 such that the convergent housing 56 is a reticular convergent housing. For example, a middle portion 61 may be formed from a plurality of intersecting support members 101 defining a plurality of cavities 84 therebetween. For the embodiment shown, the support members 101 are formed integrally such that the middle portion 61 is a solid piece. It should be recognized that in other embodiments the support members 101 may be formed separately and adhered or fastened to at least one of the base 96 or the cap 94. Further, in some embodiments, the support members 101 may be adhered or fastened to each other. The orientation, size, and placement of the support members 101 and cavities 84 may be adjusted to give the reticular convergent housing both a weight and load carrying characteristics as desired. It should be recognized that the mesh 82 may be formed in any pattern and from any material to transfer the load acting on the fan assembly 24 to the frame 48.

It should be recognized that, in other embodiments, the convergent housing 56 may have any shape or configuration. For example, the middle portion 61 may be fully enclosed without any voids or spaces. In another embodiment, the middle portion 61 may be formed from a combination of ribs 59 (e.g., FIGS. 4 and 5) and support members 101 (e.g., FIGS. 6 and 7). Still, in further embodiments, the middle portion 61 may include beams, struts, partitions, or other applicable load carrying structures extending between the base 96 and the cap 94.

Figure 8:
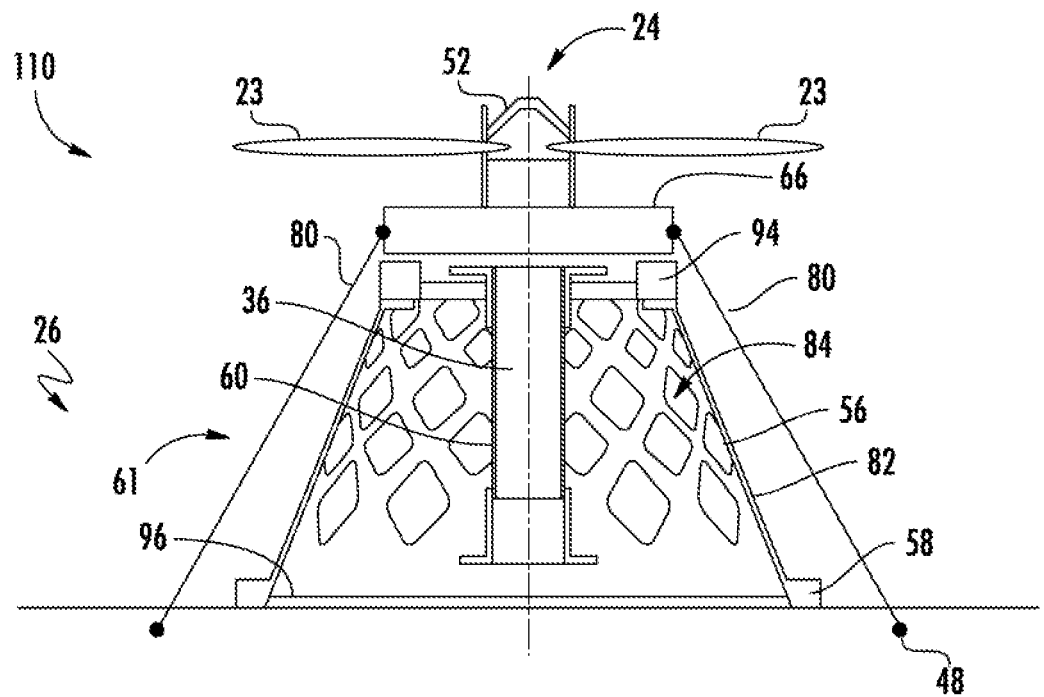
FIG. 8 is a view of an exemplary housing assembly and fan assembly utilizing thrust bars according to aspects of the present disclosure.

Referring now to FIG. 8, a cross-sectional view of a housing assembly 26 and fan assembly 24 utilizing thrust bars 80 is illustrated in accordance to aspects of the present disclosure. The thrust bars 80 may be utilized with any suitable configuration of the housing assembly 26, such as shown in FIGS. 4-7. In the illustrated embodiment, the fan blade support assembly 110 includes at least one thrust bar 80 extending between the frame 48 to at least one of the fan assembly 24 or the support 66. The thrust bar(s) 80 may be mechanically adhered using fasteners, bolts, screws, etc. The thrust bar(s) 80 may also be adhered using bonding, such as adhesives, welding, friction welding, etc. For the exemplary embodiment, the thrust bar(s) 80 transfer loads acting on the fan assembly 24 to the frame 48 of the aircraft 10. As such, the thrust bar(s) 80 may be used in conjunction with the convergent housing 56. As shown in the exemplary embodiment, the thrust bar(s) 80 are coupled to a support 66 that communicates the forces acting on the fan assembly 24. It should be recognized that, in other embodiments, the thrust bar(s) 80 may be coupled to the cap 94, directly coupled to the fan assembly 24, or may be indirectly coupled via any number of intermediary structures. Further, the thrust bar(s) 80 may be directly coupled to the frame 48 or may be indirectly coupled to the frame 48 via any number of intermediary structures.

Figure 9:
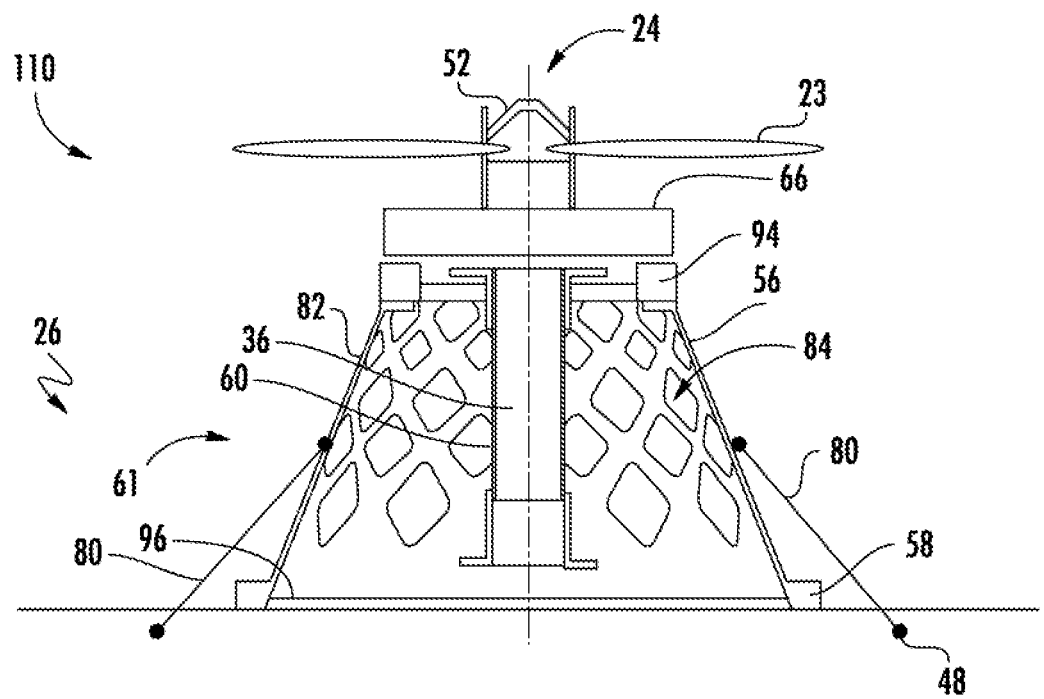
FIG. 9 is a view of another exemplary housing assembly and fan assembly utilizing thrust bars attached to a middle portion of a convergent housing.
Figure 10:
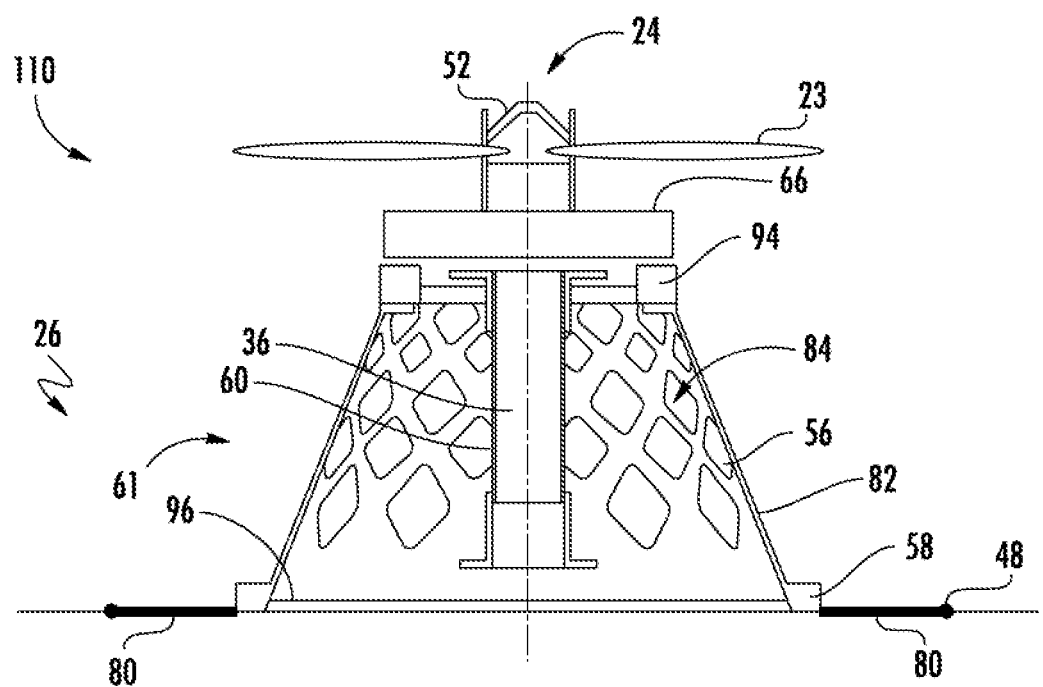
FIG. 10 is a view of another exemplary housing assembly and fan assembly utilizing thrust bars attached to a base of a convergent housing.
Figure 11:
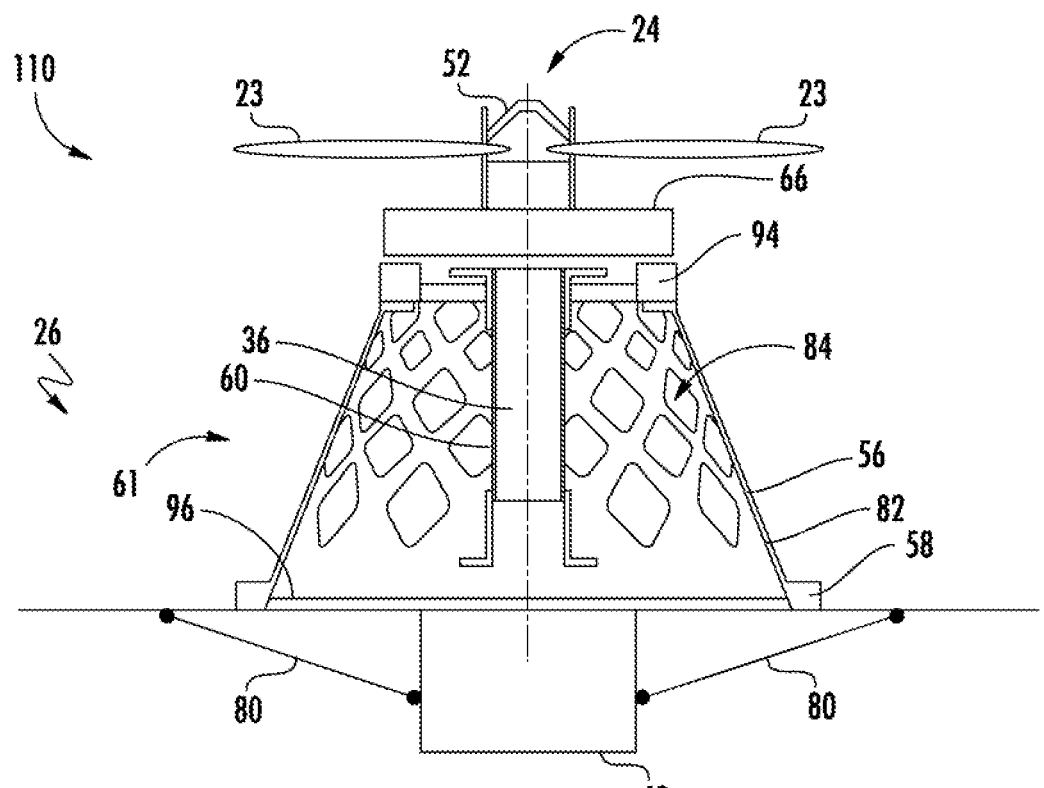
FIG. 11 is a view of another exemplary housing assembly and fan assembly utilizing thrust bars attached to a speed change mechanism.

Referring now to FIGS. 9-11, various views of other fan blade support assemblies 110 are illustrated with thrust bars 80 coupled to the frame 48 with various configurations in accordance to aspects of the present disclosure. In the embodiment of FIG. 9, thrust bars 80 extend between the frame 48 and the middle portion 61 of the convergent housing 56. In the embodiment of FIG. 10, thrust bars 80 extend between the frame 48 and the base 96 of the convergent housing 56. In the embodiment of FIG. 11, thrust bars 80 extend between the frame 48 and the speed change mechanism 42, such as a gearbox or transmission. Further, in other embodiments, the thrust bars 80 may attach the frame 48 to any other component of the fan blade support assembly 110.

One or more of the components of the fan blade support assembly 110 may be produced using additive manufacturing. For example, at least one of the convergent housing 56, sealing shroud 60, or lower shroud 70 may be additively manufactured.

"Additive manufacturing" (AM), as used herein, generally refers to processes involving the buildup of one or more materials to make a net or near net shape (NNS) object, in contrast to subtractive manufacturing methods. Though additive manufacturing is an industry standard term (ASTM F2792), AM encompasses various manufacturing and prototyping techniques known under a variety of names, including freeform fabrication, 3D printing, rapid prototyping/tooling, etc. AM techniques may be used to fabricate complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include patterns for investment casting, metal molds for injection molding and die casting, and molds and cores for sand casting. Fabrication of prototype objects to enhance communication and testing of concepts during the design cycle are other common usages of AM processes.

Laser sintering/melting techniques can specifically entail projecting a laser beam onto a controlled amount of powder material (e.g., a powder metal material) on a substrate (e.g., build plate) so as to form a layer of fused particles or molten material thereon. By moving the laser beam relative to the substrate along a predetermined path, often referred to as a scan pattern, the layer can be defined in two dimensions on the substrate (e.g., the "x" and "y" directions), the height or thickness of the layer (e.g., the "z" direction) being determined in part by the laser beam and powder material parameters. Scan patterns can comprise parallel scan lines, also referred to as scan vectors or hatch lines, and the distance between two adjacent scan lines may be referred to as hatch spacing, which may be less than the diameter of the laser beam or melt pool so as to achieve sufficient overlap to ensure complete sintering or melting of the powder material. Repeating the movement of the laser along all or part of a scan pattern may facilitate further layers of material to be deposited and then sintered or melted, thereby fabricating a three-dimensional object.

For example, laser sintering and melting techniques can include using continuous wave (CW) lasers, such as Nd:YAG lasers operating at or about 1064 nm. Such embodiments may facilitate relatively high material deposition rates particularly suited for repair applications or where a subsequent machining operation is acceptable in order to achieve a finished object. Other laser sintering and melting techniques may alternatively or additionally be utilized such as, for example, pulsed lasers, different types of lasers, different power/wavelength parameters, different powder materials or various scan patterns to facilitate the production of one or more three-dimensional objects.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fan blade support assembly for an aircraft, the fan blade support assembly comprising:
    a fan assembly having a plurality of fan blades;
    a power shaft extending between the fan assembly and an engine of the aircraft; and
    a housing assembly positioned around the power shaft, wherein the housing assembly comprises:
        a convergent housing comprising:
            a cap;
            a base; and
            a middle portion extending therebetween, wherein the base defines a first diameter and the cap defines a second diameter less than the first diameter, the middle portion including a plurality of load supporting members;
        a sealing shroud positioned between the convergent housing and the power shaft, wherein a lubrication conduit is defined between the sealing shroud and the power shaft the lubrication conduit to supply lubricant to the power shaft;
        a seal preventing the lubricant from entering a dry region between the load supporting members and the sealing shroud; and
        a second shroud extending between an outer diameter at the base of the convergent housing and the sealing shroud.

2. The fan blade support assembly of claim 1, wherein the housing assembly further comprises:
    a support at the cap of the convergent housing, wherein the support extends between the convergent housing and the fan assembly.

3. The fan blade support assembly of claim 2, further comprising:
    a thrust bar extending between a frame of the aircraft to at least one of the fan assembly or the support.

4. The fan blade support assembly of claim 1, further comprising:
    an assembly casing extending between the power shaft and the outer diameter of the second shroud, wherein the second shroud and the assembly casing define a passageway therebetween for the passage of the lubricant.

5. The fan blade support assembly of claim 1, wherein a diameter of the middle portion transitions between the first diameter and the second diameter.

6. The fan blade support assembly of claim 5, wherein the transition between the first diameter and the second diameter is a linear transition.

7. The fan blade support assembly of claim 1, wherein the sealing shroud provides lubricant a bearing.

8. The fan blade support assembly of claim 1, wherein the convergent housing transfers forces acting on the fan assembly to a frame of the aircraft.

9. The fan blade support assembly of claim 7, wherein the bearing supports the power shaft, and wherein the sealing shroud at least partially houses the bearing.

10. The fan blade support assembly of claim 7, wherein the bearing is at least one of a ball bearing or a radial bearing.

11. The fan blade support assembly of claim 1, wherein the plurality of intersecting support members define a plurality of cavities therebetween such that the convergent housing is a reticular convergent housing.

12. The fan blade support assembly of claim 1, further comprising:
    a speed change mechanism positioned between the power shaft and the engine.

13. The fan blade support assembly of claim 12, wherein the engine comprises an output shaft coupled to the speed change mechanism.

14. An aircraft comprising:
    an engine;
    a fan assembly attached to the engine, wherein the fan assembly comprises a plurality of fan blades;
    a power shaft extending between the fan assembly and the engine of the aircraft; and
    a housing assembly positioned around the power shaft, wherein the housing assembly comprises:

a convergent housing comprising:
- a cap;
- a base; and
- a middle portion extending therebetween, wherein the base defines a first diameter and the cap defines a second diameter less than the first diameter, the middle portion including a plurality of load supporting members;

a sealing shroud positioned between the convergent housing and the power shaft, wherein a lubrication conduit is defined between the sealing shroud and the power shaft the lubrication conduit to supply lubricant to the power shaft;

a seal preventing the lubricant from entering a dry region between the load supporting members and the sealing shroud; and a second shroud extending between an outer diameter at the base of the convergent housing and the sealing shroud.

15. The aircraft of claim 14, wherein the aircraft is at least one of a propeller driven aircraft or a rotary-wing aircraft.

16. The aircraft of claim 14, wherein the plurality of intersecting support members define a plurality of cavities therebetween such that the convergent housing is a reticular convergent housing.

17. The aircraft of claim 14, wherein the housing assembly further comprises:
a support at the cap of the convergent housing, wherein the support extends between the convergent housing and the fan assembly.

18. The aircraft of claim 14, wherein a diameter of the middle portion transitions between the first diameter and the second diameter.

19. The aircraft of claim 18, wherein the transition between the first diameter and the second diameter is a linear transition.

20. The aircraft of claim 18, further comprising:
an assembly casing extending between the power shaft and the outer diameter of the second shroud, wherein the second shroud and the assembly casing define a passageway therebetween for the passage of the lubricant.

* * * * *